United States Patent
Koyun et al.

(10) Patent No.: US 10,965,652 B2
(45) Date of Patent: Mar. 30, 2021

(54) SECURE MESSAGING

(71) Applicants: Ismet Koyun, Worms (DE); Tan Sarihan, Potomac, MD (US)

(72) Inventors: Ismet Koyun, Worms (DE); Tan Sarihan, Potomac, MD (US)

(73) Assignee: KOBIL Systems GmbH, Worms (DE)

(*) Notice: Subject to any disclaimer, the term of this patent is extended or adjusted under 35 U.S.C. 154(b) by 123 days.

(21) Appl. No.: 16/206,434

(22) Filed: Nov. 30, 2018

(65) Prior Publication Data
US 2019/0097981 A1    Mar. 28, 2019

Related U.S. Application Data

(63) Continuation of application No. PCT/EP2016/062559, filed on Jun. 2, 2016.

(51) Int. Cl.
*H04L 29/06* (2006.01)
*H04L 9/08* (2006.01)
*H04L 9/32* (2006.01)

(52) U.S. Cl.
CPC ........ *H04L 63/0428* (2013.01); *H04L 9/0822* (2013.01); *H04L 9/0861* (2013.01); *H04L 9/3247* (2013.01); *H04L 63/061* (2013.01); *H04L 63/102* (2013.01); *H04L 2209/60* (2013.01)

(58) Field of Classification Search
CPC . H04L 63/0428; H04L 9/0861; H04L 9/3247; H04L 63/061; H04L 63/102; H04L 9/0822; H04L 2209/60
See application file for complete search history.

(56) References Cited

U.S. PATENT DOCUMENTS

| | | | |
|---|---|---|---|
| 9,942,034 B2* | 4/2018 | Le Saint | H04L 9/0822 |
| 2001/0055396 A1* | 12/2001 | Jevans | H04L 63/0471 380/282 |
| 2002/0051545 A1* | 5/2002 | Ogilvie | H04L 9/00 380/280 |
| 2003/0081789 A1* | 5/2003 | Numao | H04L 9/085 380/278 |
| 2004/0117655 A1* | 6/2004 | Someshwar | H04L 63/0428 726/1 |
| 2005/0180576 A1* | 8/2005 | Jevans | H04L 63/0435 380/284 |
| 2006/0193473 A1* | 8/2006 | Fu | H04L 9/0822 380/277 |
| 2007/0028099 A1* | 2/2007 | Entin | H04L 12/18 713/163 |
| 2010/0223457 A1* | 9/2010 | Durham | H04L 9/0827 713/152 |

(Continued)

FOREIGN PATENT DOCUMENTS

CA    2 296 631 A1    7/2001

*Primary Examiner* — J. Brant Murphy
(74) *Attorney, Agent, or Firm* — Reinhart Boerner Van Deuren P.C.

(57) ABSTRACT

Disclosed herein are embodiments of a method performed by an apparatus. In the method, a message including a plurality of encrypted payload information items is generated. Each of the plurality of encrypted payload information items is decryptable with a respective decryption key of a plurality of decryption keys. The message is to at least one recipient.

21 Claims, 9 Drawing Sheets

(56) References Cited

U.S. PATENT DOCUMENTS

| | | | |
|---|---|---|---|
| 2014/0068262 A1* | 3/2014 | Robertson | H04L 63/0815 713/168 |
| 2016/0226844 A1* | 8/2016 | Pecka | H04L 51/08 |
| 2016/0241389 A1* | 8/2016 | Le Saint | H04L 9/14 |
| 2016/0267738 A1* | 9/2016 | Carstens | E05B 65/5246 |

* cited by examiner

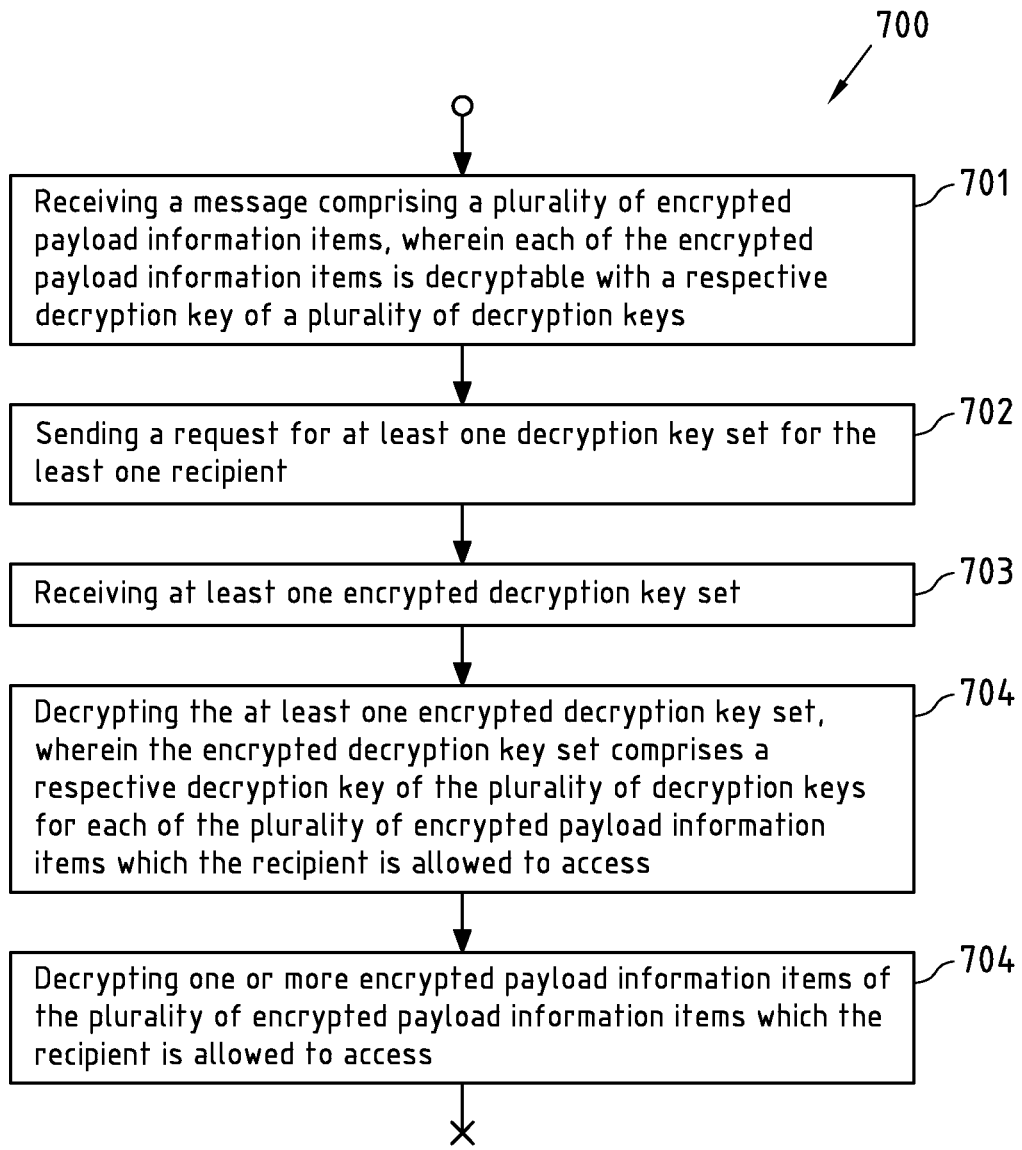

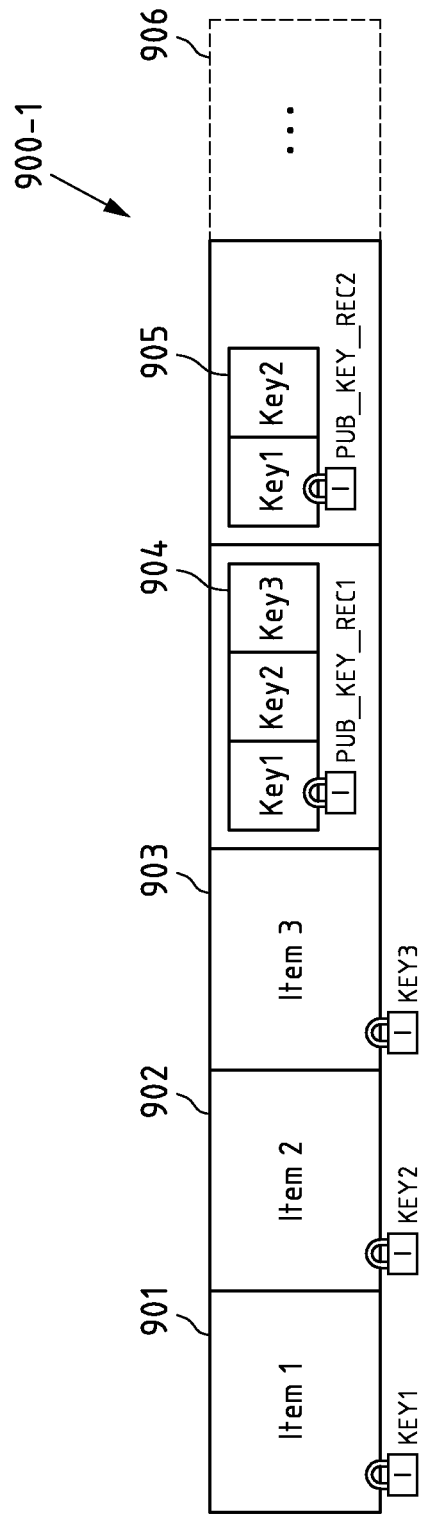

SECURE MESSAGING

CROSS-REFERENCE TO RELATED PATENT APPLICATION

This patent application is a continuation of PCT/EP2016/062559, filed Jun. 2, 2016, the entire teachings and disclosure of which are incorporated herein by reference thereto.

FIELD

The invention relates to the field of secure messaging and more specifically to generating a message and sending the message.

BACKGROUND

For secure messaging, messages may be encrypted today such that a recipient of the message can access the message only if the recipient has access to the decryption key for decrypting the encrypted message. Accordingly, a message only contains information which is intended to be received by all recipients of the message having access to this decryption key. For different information which is intended to be received by only some of these recipients or by different recipient a different message (i.e. a message decryptable with a different decryption key) is accordingly used. This is particularly burdensome in associated business processes where different and at least partially overlapping information have to be shared with different business partners involved in these associated business processes, because for each business partner a different message has to be used.

SUMMARY OF SOME EMBODIMENTS OF THE INVENTION

According to a first aspect of the invention, a method performed by an apparatus is presented, which comprises:
generating a message comprising a plurality of encrypted payload information items, wherein each of the plurality of encrypted payload information items is decryptable with a respective decryption key of a plurality of decryption keys, and
sending the message to at least one recipient.

According to the first aspect of the invention, an apparatus is presented, which comprises means for performing the method according to the first aspect of the invention. For example, the method according to the first aspect of the invention may be a method performed by the apparatus according to the first aspect of the invention.

The apparatus and the method according to the first aspect of the invention may be for secure messaging, for example for sending a secure message.

The apparatus according to the first aspect of the invention may be or may be part of a device such as a sender device or a server device (e.g. a key server device), for example a sender device or a server device for a messaging system (e.g. the system according to the third aspect of the invention). Alternatively, the apparatus according to the first aspect of the invention may comprise or may be formed by one or more devices such as a sender device and/or a server device (e.g. a key server device), for example a sender device and/or a server device for a messaging system (e.g. the system according to the third aspect of the invention).

According to the first aspect of the invention, a computer program code is presented, the computer program code when executed by a processor causing an apparatus to perform the actions of the method according to first aspect of the invention.

According to the first aspect of the invention, a computer readable storage medium (e.g. a tangible and/or non-transitory computer readable storage medium) is presented, in which the computer program code according to the first aspect of the invention is stored.

According to a second aspect of the invention, a method performed by an apparatus is presented, which comprises:
receiving a message comprising a plurality of encrypted payload information items, wherein each of the encrypted payload information items is decryptable with a respective decryption key of a plurality of decryption keys, and
decrypting one or more encrypted payload information items of the plurality of encrypted payload information items.

According to the second aspect of the invention, an apparatus is presented, which comprises means for performing the method according to the second aspect of the invention. For example, the method according to the second aspect of the invention may be a method performed by the apparatus according to the second aspect of the invention.

The apparatus and the method according to the second aspect of the invention may be for secure messaging, for example for receiving a secure message.

The apparatus according to the second aspect of the invention may be or may be part of a device such as a recipient device or a client device, for example a recipient device or a client device for a messaging system (e.g. the system according to the third aspect of the invention). Alternatively, the apparatus according to the second aspect of the invention may comprise or may be formed by one or more devices such as a recipient device (e.g. a user device) and/or a client device, for example a recipient device (e.g. a user device) and/or a client device for a messaging system (e.g. the system according to the third aspect of the invention).

According to the second aspect of the invention, a computer program code is presented, the computer program code when executed by a processor causing an apparatus to perform the actions of the method according to second aspect of the invention.

According to the second aspect of the invention, a computer readable storage medium (e.g. a tangible and/or non-transitory computer readable storage medium) is presented, in which the computer program code according to the second aspect of the invention is stored.

According to a third aspect of the invention, a method is presented, which comprises the steps of the methods according to the first and second aspect of the invention. The method according to the second aspect of the invention may be a method performed in a messaging system (e.g. the system according to the third aspect of the invention).

According to the third aspect of the invention, a system is presented, which comprises at least one apparatus according to the first aspect of the invention and at least one apparatus according to the second aspect of the invention. The system according to the third aspect of the invention may be a messaging system (e.g. a secure messaging system).

In the following, the first, second and third aspects of the invention are—at least partially exemplary—described.

A message comprising a plurality of encrypted payload information items may be understood to mean that the message comprises at least two, for example at least three different payload information items in encrypted form. Due to the encryption, the message may be referred to as a secure message.

A payload information item may represent information that is intended to be received by one or more recipients of the message. For example, the payload information items may represent information necessary to perform one or more associated business processes such as completing different bookings for a travel arrangement.

Accordingly, each of the plurality of encrypted payload information items (i.e. each encrypted payload information item of the plurality of encrypted payload information items) may represent such information in encrypted form. In addition to the plurality of encrypted payload information items the message may for example comprise further information items for facilitating and/or controlling transmitting of the message such as header and/or metadata information items (e.g. a signature information item, a sender information item, a recipient information item, an encryption information item, and/or a message policy information item).

Each of the plurality of encrypted payload information items (i.e. each encrypted payload information item of the plurality of encrypted payload information items) is decryptable with a respective decryption key of a plurality of decryption keys. This may be understood to mean that for decrypting one of the encrypted payload information items a respective decryption key of the plurality of decryption keys is to be used. For example, the respective decryption key of the plurality of decryption keys is different for each of the plurality of encrypted payload information items.

As a result of decrypting the one or more encrypted payload information items of the plurality of encrypted payload information items one or more accessible payload information items may be obtained. Accessing an encrypted payload information item of the plurality of encrypted payload information items may be understood to mean that the encrypted payload information item is decrypted.

For different encrypted payload information items of the plurality of encrypted payload information items different respective decryption keys of the plurality of decryption keys may be used for decrypting. Accordingly, a recipient (e.g. the at least one recipient) may for example access a certain encrypted payload information item of the plurality of encrypted payload information items if the recipient is associated with and/or has access to the respective decryption key of the plurality of decryption key with which the certain encrypted payload information item is decryptable.

Encrypting the payload information items may thus have the effect that access to the encrypted payload information items of the plurality of encrypted payload information items may be controlled independently by controlling access to the decryption keys of the plurality of decryption keys. For example, different recipients may have access to different decryption keys of the plurality of decryption keys and may thus decrypt and/or access different encrypted payload information items of the plurality of encrypted payload information items. Accordingly, the information represented by the payload information items are protected against unauthorized access and security is increased.

The message may be or may be part of a message according to a message standard such as the Internet Message Format (IMF) which is specified in RFC5322 of the Internet Engineering Task Force (IETF) and/or the Cryptographic Message Syntax (CMS) which is specified in RFC5652 of the IETF.

Generating the message may be understood to mean that the message is at least partially assembled from the plurality of encrypted information items. Additionally the message may be assembled from further information items such as header and/or metadata information items as disclosed above. For example, the plurality of encrypted information items and/or the further information items may at least partially be hold available and/or received by the apparatus according to the first aspect of the invention for generating the message. Alternatively or additionally, generating the message may comprise at least partially generating and/or determining the plurality of encrypted information items and/or the further information items.

A recipient may be understood to mean a person (e.g. a user) and/or an organization (e.g. a company such as a service provider company) to which the message is sent and/or which receives the message.

Sending the message to at least one recipient may be understood to mean that the message is sent such that it is receivable by the recipient and/or an apparatus of the recipient (e.g. the apparatus according to the second aspect of the invention). For example, the message may be addressed to the at least one recipient and/or to an apparatus of the recipient (e.g. the apparatus according to the second aspect of the invention). For example, the message may comprise an address associated with the at least one recipient (e.g. a recipient identifier and/or a recipient address such as an email address) and/or an address associated with an apparatus of the recipient (e.g. a device identifier and/or a device address such as an IP address and/or a phone number) as a recipient information item.

For example, the message may be sent by the apparatus according to the first aspect of the invention in a signal or as part of a signal (e.g. a communication signal). The message may for example be sent by communicating the message in such a signal or as part of such a signal by communication means of the apparatus according to the first aspect of the invention, for example a communication interface such as a network interface. Alternatively or additionally, the message may for example be sent by communication means external to the apparatus according to the first aspect of the invention.

The message may be sent and/or received via a communication link, for example a network link such as an internet link, a virtual private network link and/or a cellular network link. The communication link may be composed of one or more intermediate communication links and comprise one or more intermediate stations.

Receiving the message may be understood to mean that a signal (e.g. a communication signal) comprising the message is received and that the message is extracted from the received signal.

For example, the message is received by the apparatus according to the second aspect of the invention. For example, the message is received by communication means of the apparatus according to the second aspect of the invention such as a network interface.

The means of the apparatuses according to the first and second aspect of the invention may be implemented in hardware and/or software. They may comprise for example at least one processor for executing computer program code for realizing the required functions, at least one memory storing the program code, or both. Alternatively, they could comprise for example circuitry that is designed to realize the required functions, for example implemented in a chipset or a chip, like an integrated circuit. In general, the means may comprise for example one or more processing means such as a processor and a memory. Optionally, the apparatuses may comprise various other components, like a communication interface (e.g. a network interface such as a network card), a user interface (e.g. a touch-sensitive display, a keyboard, a touchpad, a display, etc.) etc.

For example, the apparatus according to the first aspect of the invention may comprise at least one processor and at least one memory including computer program code, the at least one memory and the computer program code configured to, with the at least one processor, cause an apparatus at least to perform at least partially the method and/or the steps of the method according to the first aspect of the invention. Similarly, the apparatuses according to the second aspect of the invention may comprise at least one processor and at least one memory including computer program code, the at least one memory and the computer program code configured to, with the at least one processor, cause an apparatus at least to perform at least partially the method and/or the steps of the method according to the second aspect of the invention.

As disclosed above, access to the encrypted payload information items of the plurality of encrypted payload information items of the message may be controlled independently by controlling access to the decryption keys of the plurality of decryption keys. The present invention thus enables to use the same message to securely provide different recipients with different information by providing the different recipients access to different decryption keys of the plurality of decryption keys. This for example allows efficiently providing information to different service provider companies providing associated services. An example of such associated services is making travel arrangements such as booking a flight, a hotel and a rental car. The same message may be used to provide the information necessary to complete the different bookings to the airline company, the hotel company and the car rental company. For completing booking a flight (e.g. credit card information, identity information, etc.) different information than for completing booking a hotel (e.g. credit card information, etc.) and/or a rental car (e.g. credit card information, driver license information, etc.) may be necessary. Accordingly, access of the airline company to the encrypted payload information items of the plurality of encrypted information items may be restricted differently than the access of the hotel company and/or the car rental company by providing the airline company, the hotel company and the car rental company access to at least partially different decryption keys of the plurality of decryption keys.

In the following, the features of exemplary embodiments according to the invention are described by way of examples.

According to an exemplary embodiment of the invention, the plurality of encrypted payload information items comprises at least a first encrypted payload information item and a second encrypted payload information item, wherein the first encrypted payload information item is decryptable with a first decryption key and the second encrypted payload information item is decryptable with a second decryption key different from the first decryption key.

According to an exemplary embodiment of the invention, the method according to the first aspect of the invention further comprises:
    receiving and/or holding available a plurality of payload information items, and
    encrypting the plurality of payload information items to obtain the plurality of encrypted payload information items.

Holding available the plurality of payload information items may be understood to mean that the plurality of payload information items is stored in memory means of the apparatus according to the first aspect of the invention. Example of memory means include a volatile memory and a non-volatile memory. Alternatively or additionally, the plurality of payload information items may be received by the apparatus according to the first aspect of the invention, for example by communication means of the apparatus according to the first aspect of the invention such as a communication interface.

As a result of encrypting the plurality of payload information items the plurality of encrypted payload information items is obtained. For example, the message is assembled from this plurality of encrypted payload information items.

According to an exemplary embodiment of the invention, the plurality of encrypted payload information items are encrypted and/or decryptable by use of one of:
    an asymmetric cryptography algorithm, and
    a symmetric cryptography algorithm.

An example of an asymmetric cryptography algorithm is the RSA-Algorithm (Rivest-Shamir-Adleman-Algorithm). The RSA-Algorithm is for example specified in Public-Key Cryptography Standards #1 (PKCS #1) as published by the RSA Laboratories.

In case the plurality of encrypted payload information items are encrypted and/or decryptable by use of an asymmetric cryptography algorithm, each of the plurality of decryption keys may be a public key of an asymmetric key pair comprising a private key and the public key. For each of the plurality of payload information items a different asymmetric key pair may be generated and/or used for encrypting and decrypting.

Exemplary symmetric cryptography algorithms are the Advanced Encryption Standard (AES-Algorithm) and the Triple Data Encryption Algorithm (3DEA-Algorithm). The AES-Algorithm and the 3DEA-Algorithm are for example specified by the U.S. National Institute of Standards and Technology (NIST).

In case the plurality of encrypted payload information items are encrypted and/or decryptable by use of a symmetric cryptography algorithm, each of the plurality of decryption keys may be a symmetric key. For each of the plurality of payload information items a different symmetric key may be generated and/or used for encrypting and decrypting.

According to an exemplary embodiment of the invention, the method according to the first aspect of the invention further comprises:
    determining whether the at least one recipient is allowed to access one or more of the encrypted payload information items of the plurality of encrypted payload information items, and
    generating at least one decryption key set for the at least one recipient, wherein the at least one decryption key set for the at least one recipient comprises a respective decryption key of the plurality of decryption keys for each of the one or more of the encrypted payload information items of the plurality of payload information items for which it is determined that the at least one recipient is allowed to access.

The determining whether the at least one recipient is allowed to access one or more encrypted payload information items of the plurality of encrypted payload information items is for example based on access rules for the encrypted payload information items. For example, such access rules may define which recipient(s) are allowed to access which one or more encrypted payload information items of the plurality of encrypted payload information. An example of access rules is an access control matrix defining which recipient(s) are allowed to access which one or more encrypted payload information items of the plurality of encrypted payload information.

Generating the at least one decryption key set for the at least one recipient may be understood to mean that the at least one decryption key set is assembled only from the decryption keys of the plurality of decryption keys for decrypting the encrypted payload information items of the plurality of encrypted payload information items for which it is determined that the at least one recipient is allowed to access.

The method according to the first aspect of the invention may further comprise:
  encrypting the at least one decryption key set to obtain an encrypted decryption key set that is decryptable with a decryption key associated with and/or accessible to the at least one recipient.

As a result of encrypting the at least one decryption key set the encrypted decryption key set is obtained. Therein, the at least one decryption key set is encrypted such that it is decryptable with a decryption key associated with and/or accessible to the at least one recipient.

Furthermore, the method according to the second aspect of the invention may further comprise:
  decrypting such an encrypted decryption key set, wherein the encrypted decryption key set comprises a respective decryption key for each of the one or more encrypted payload information items of the plurality of payload information items which the recipient is allowed to access.

For example, a decryption key associated with and/or accessible to a recipient may be used for decrypting the encrypted decryption key set.

A decryption key may be understood to be associated with and/or accessible to a recipient if the decryption key is associated with and/or accessible to an apparatus of the recipient (e.g. the apparatus according to the second aspect of the invention), for example if the decryption key is stored in memory means of the apparatus of the recipient (e.g. the apparatus according to the second aspect of the invention). Alternatively or additionally, a decryption key may be understood to be associated with and/or accessible to a recipient if the decryption key has been previously exchanged with (e.g. send to and/or received from) the recipient and/or an apparatus of the recipient (e.g. the apparatus according to the second aspect of the invention).

For example, the at least one encrypted decryption key set is encrypted and/or decryptable by use of one of:
  an asymmetric cryptography algorithm, and
  a symmetric cryptography algorithm.

As disclosed above, an example of an asymmetric cryptography algorithm is the RSA-Algorithm, and exemplary symmetric cryptography algorithms are the AES-Algorithm and the 3DEA-Algorithm.

In case the at least one encrypted decryption key set is encrypted and/or decryptable by use of an asymmetric cryptography algorithm, the decryption key may be a private key of an asymmetric key pair of the at least one recipient that has been previously assigned to the at least one recipient, for example the private key of this asymmetric key pair is (e.g. only) stored in memory means of the apparatus according to the second aspect of the invention. In this case, the public key of this asymmetric key pair may be used for encrypting the decryption key set.

In case the at least one encrypted decryption key set is encrypted and/or decryptable by use of a symmetric cryptography algorithm, the decryption key may be a symmetric key that has been previously exchanged with the at least one recipient, for example the symmetric key has been exchanged with (e.g. received from and/or send to) the apparatus according to the second aspect of the invention. In this case, this symmetric key may be used for encrypting the decryption key set.

According to an exemplary embodiment of the invention, the message further comprises the at least one encrypted decryption key set. For example, the message may further comprise a plurality of encrypted decryption key sets, for example the at least one encrypted decryption key set and one or more further encrypted decryption key sets.

For example, the message may comprise at least a first encrypted decryption key set and a second encrypted decryption key set, wherein the first encrypted decryption key set represents a first decryption key and a second decryption key of the plurality of encryption keys in encrypted form, wherein the second encrypted decryption key set represents either the first decryption key or the second decryption key of the plurality of encryption keys in encrypted form. The first encrypted decryption key set may be decryptable with a decryption key associated with and/or accessible to a first recipient, and the second encrypted decryption key set may be decryptable with a different decryption key associated with and/or accessible to a second recipient.

This exemplary embodiment of the invention may have the effect that access to the encrypted decryption key set(s) and, thus, to one or more payload information items of the plurality of payload information items is restricted to recipients being associated with and/or having access to the decryption key(s) with which the encrypted decryption key set(s) is (are) decryptable.

According to an exemplary embodiment of the invention, the method according to the first aspect of the invention further comprises:
  receiving a request for the at least one decryption key set for the at least one recipient, and
  sending the at least one encrypted decryption key set to the at least one recipient (for example, in response to the request).

Furthermore, the method according to the second aspect of the invention may further comprise:
  sending a request for the at least one decryption key set for the at least one recipient, and
  receiving the at least one encrypted decryption key set.

Sending the request may be understood to mean that a signal (e.g. a communication signal) comprising the request is sent. Receiving the request may accordingly be understood to mean that a signal (e.g. a communication signal) comprising the request is received and that the request is extracted from the received signal.

The request may be sent and/or received via a communication link, for example a network link such as an internet link, a virtual private network link and/or a cellular network link.

For example, the request is sent by the apparatus according to the second aspect of the invention. For example, the request is sent by communication means of the apparatus according to the second aspect of the invention such as a network interface. For example, the request is received by the apparatus according to the first aspect of the invention. For example, the request is received by communication means of the apparatus according to the first aspect of the invention such as a network interface.

The request may comprise an information item identifying the at least one recipient. In response to this request, the above disclosed determining whether the at least one recipient item is allowed to access one or more of the encrypted payload information items of the plurality of encrypted payload information items may be performed for the recipient identified by this information item. Subsequently, decryption key set may be generated and encrypted for the at least one recipient identified by the information item as disclosed above.

The encrypted decryption key set may be send to the at least one recipient in response to the request. Sending the encrypted decryption key set to the at least one recipient may be performed similar to sending the message to the at least one recipient as disclosed above.

For example, the encrypted decryption key set may be received as a response to the request. Receiving the encrypted decryption key set may be understood to mean that a signal (e.g. a communication signal) comprising the message is received and that the message is extracted from the received signal.

The encrypted decryption key set may be sent and/or received via a communication link, for example a network link such as an internet link, a virtual private network link and/or a cellular network link.

For example, the encrypted decryption key set is sent by the apparatus according to the first aspect of the invention. For example, the encrypted decryption key set is sent by communication means of the apparatus according to the first aspect of the invention such as a network interface. For example, the encrypted decryption key set is received by the apparatus according to the second aspect of the invention. For example, the encrypted decryption key set is received by communication means of the apparatus according to the second aspect of the invention such as a network interface.

This exemplary embodiment of the invention may have the effect that access to one or more payload information items of the plurality of payload information items is controlled by requiring the recipients to request for a decryption key set if the they desire to access the one or more payload information items of the plurality of payload information items. Accordingly, changes in access rules after sending the message may be also enforced by this exemplary embodiment.

According to an exemplary embodiment of the invention, the method according to the first and/or second aspect of the invention further comprises:

sending the message to at least one further recipient.

For example, the message may be sent at least to a first recipient (e.g. the at least one recipient) and to a second recipient (e.g. the at least one further recipient).

Sending the message may be performed as disclosed above. For example, the message may be sent (e.g. forwarded) from the apparatus according to the second aspect of the invention to the at least one further recipient. Alternatively or additionally, the message may be sent from the apparatus according to the first aspect of the invention to at least one further recipient.

According to an exemplary embodiment of the invention, the message further comprises at least one of:
 a signature information item,
 a sender information item,
 a recipient information item,
 an encryption information item, and
 a message policy information item.

A signature information item may for example represent a digital signature of the message such as signature according to the RSASSA-PSS signature algorithm as specified in PKCS #1. Such a digital signature may allow to verify whether the message was created by a known sender, that the sender cannot deny having sent the message and/or that the message was not altered in transit.

A sender information item and a recipient information item may for example represent a address associated with the sender and an address associated with the at least one recipient (e.g. a recipient identifier and/or a recipient address such as an email address) and/or an address associated with an apparatus of the sender and an address associated with an apparatus of the recipient (e.g. a device identifier and/or a device address such as an IP address and/or a phone number). This may allow routing the message from the sender and/or an apparatus of the sender to the recipient and/or an apparatus of the recipient.

An encryption information item may for example identify the cryptography algorithm used for encrypting the plurality of information items.

A message policy information item may for example define policy rules for accessing and/or processing the message and/or the plurality of encrypted information items. For example, the message policy information item defines a date and time when the message expires and/or restricts the location where the message may be opened (e.g. only online, only offline, only at a certain geolocation, etc.) and/or requires additional user identification before the message and/or the plurality of encrypted information items may be accessed (e.g. by requiring input of a password).

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIGS. 5a-b are flowcharts of exemplary embodiments of a method according to the second aspect of the invention;

FIGS. 6a-c are exemplary embodiments of an access rule matrix, messages and decryption key sets according to the invention.

DETAILED DESCRIPTION

Figure 1:
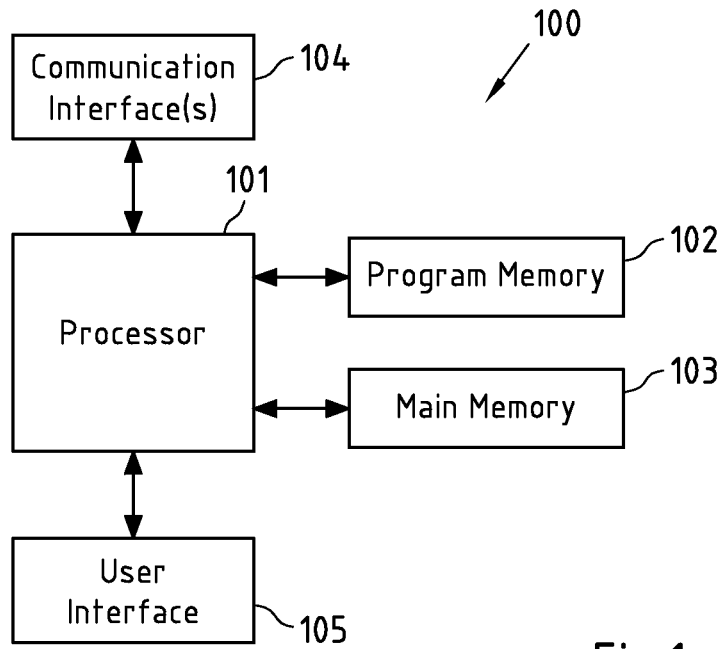
FIG. 1 is a block diagram of an exemplary embodiment of an apparatus according to the first aspect of the invention.

FIG. 1 is a block diagram of an exemplary embodiment of an apparatus according to the first aspect of the invention. In the following, it is assumed that the apparatus is a sender device 100.

Sender device 100 comprises a processor 101. Processor 101 may represent a single processor or two or more processors, which are for example at least partially coupled, for example via a bus. Processor 101 executes a program code stored in program memory 102 (for example program code causing sender device 100 to perform one or more of the embodiments of a method (or parts thereof) according to the first aspect of the invention (as for example further described below with reference to FIGS. 4a and 4b), when executed on processor 101), and interfaces with a main memory 103. Some or all of memories 102 and 103 may also be included into processor 101. One of or both of memories 102 and 103 may be fixedly connected to processor 101 or at least partially removable from processor 101, for example in the form of a memory card or stick. Program memory 102 may for example be a non-volatile memory. It may for example be a FLASH memory (or a part thereof), any of a ROM, PROM, EPROM, MRAM or a FeRAM (or a part thereof) or a hard disc (or a part thereof), to name but a few examples. Program memory 102 may also comprise an operating system for processor 101. Program memory 102 may for example comprise a first memory portion that is fixedly installed in sender device 100, and a second memory portion that is removable from sender device 100, for example in the form of a removable SD memory card.

Main memory 103 may for example be a volatile memory. It may for example be a DRAM memory, to give non-limiting example. It may for example be used as a working memory for processor 101 when executing an operating system and/or programs.

Processor 101 further controls a communication interface 104 configured to send and/or receive information such as messages via a communication link. For example, the communication interface 104 is configured to send and/or receive information in a signal or as part of a signal (e.g. a communication signal) via a communication link. An example of a communication interface is a network interface such as a network card.

Furthermore, processor 101 may further control an optional user interface 105 configured to present information to a user of sender device 100 and/or to receive information from such a user. User interface 105 may for instance be the standard user interface via which a user of ender device 100 controls other functionality thereof, such as browsing the internet, etc. Examples of such a user interface are a touch-sensitive display, a keyboard, a touchpad, a display, etc.

The components 102-105 of sender device 100 may for example be connected with processor 101 by means of one or more serial and/or parallel busses.

It is to be understood that sender device 100 may comprise various other components such.

Figure 2:
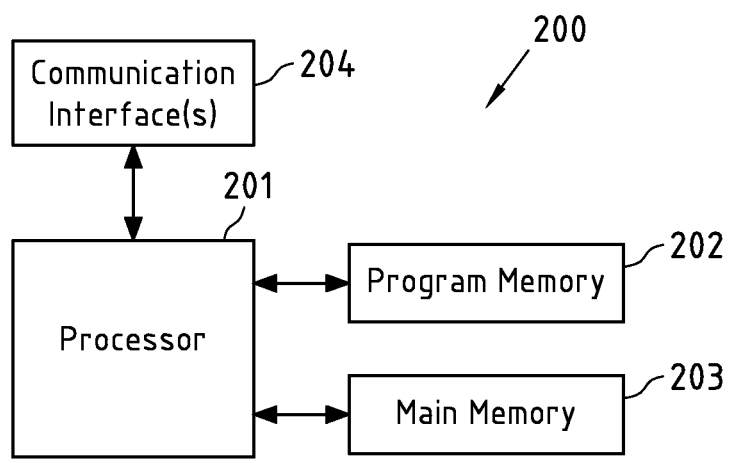
FIG. 2 is a block diagram of an exemplary embodiment of an apparatus according to the second aspect of the invention.

FIG. 2 is a block diagram of an exemplary embodiment of an apparatus according to the second aspect of the invention. In the following, it is assumed that the apparatus is a recipient device 200.

Recipient device 200 comprises a processor 201. Processor 201 may represent a single processor or two or more processors, which are for example at least partially coupled, for example via a bus. Processor 201 executes a program code stored in program memory 202 (for example program code causing recipient device 200 to perform one or more of the embodiments of a method (or parts thereof) according to the second aspect of the invention (as for example further described below with reference to FIGS. 5a and 5b), when executed on processor 201), and interfaces with a main memory 203. Some or all of memories 202 and 203 may also be included into processor 201. One of or both of memories 202 and 203 may be fixedly connected to processor 201 or at least partially removable from processor 201, for example in the form of a memory card or stick. Program memory 202 may for example be a non-volatile memory. It may for example be a FLASH memory (or a part thereof), any of a ROM, PROM, EPROM, MRAM or a FeRAM (or a part thereof) or a hard disc (or a part thereof), to name but a few examples. Program memory 202 may also comprise an operating system for processor 201. Program memory 202 may for example comprise a first memory portion that is fixedly installed in recipient device 200, and a second memory portion that is removable from recipient device 200, for example in the form of a removable SD memory card.

Main memory 203 may for example be a volatile memory. It may for example be a DRAM memory, to give non-limiting example. It may for example be used as a working memory for processor 201 when executing an operating system and/or programs.

Processor 201 further controls a communication interface 204 configured to send and/or receive information such as messages via a communication link. For example, the communication interface 204 is configured to send and/or receive information in a signal or as part of a signal (e.g. a communication signal) via a communication link. An example of a communication interface is a network interface such as a network card.

The components 202-204 of recipient device 200 may for example be connected with processor 201 by means of one or more serial and/or parallel busses.

It is to be understood that recipient device 200 may comprise various other components such as a user interface (e.g. a touch-sensitive display, a keyboard, a touchpad, a display, etc.).

Figure 3:
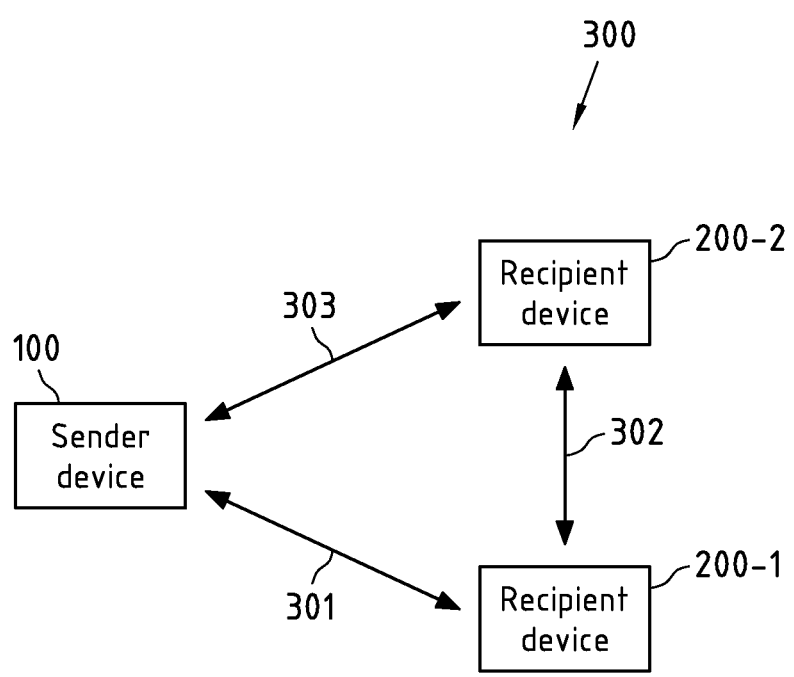
FIG. 3 is a block diagram of an exemplary embodiment of a system according to the third aspect of the invention.

FIG. 3 is a block diagram of an exemplary embodiment of a system 300 according to the third aspect of the invention.

System 300 comprises a sender device 100 and recipient devices 200-1 and 200-2. Sender device 100 corresponds to the sender device 100 of FIG. 1 as disclosed above; and each of recipient devices 200-1 and 200-2 corresponds to recipient device 200 of FIG. 2 as disclosed above.

Sender device 100 and recipient devices 200-1 and 200-2 may communicate with each other via communication links 301, 302 and 303 respectively.

System 300 may optionally comprise further entities such as a key server device (e.g. a public key server device) and/or further sender devices and/or further recipient devices.

Figure 4A:
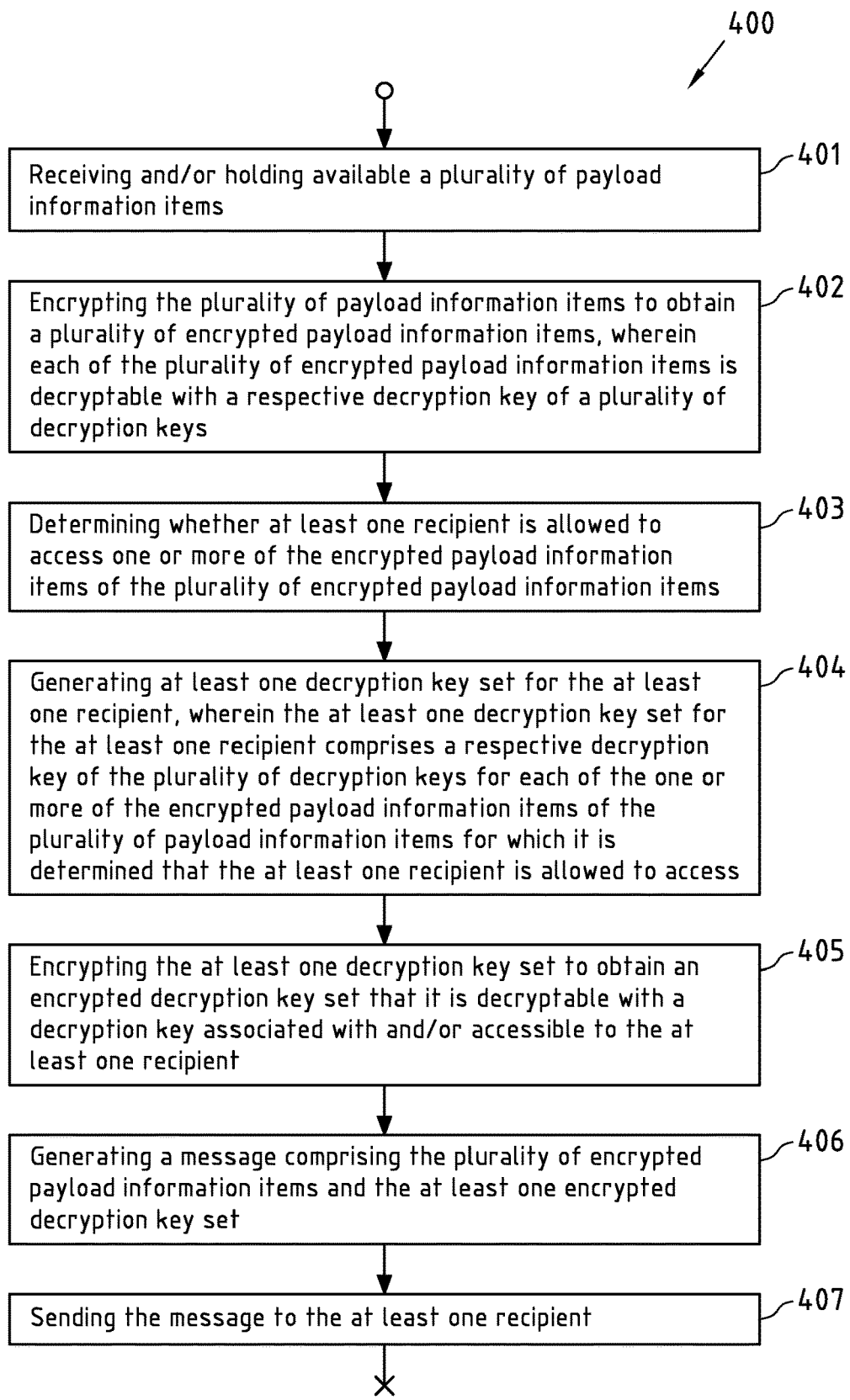
FIGS. 4a-b are flowcharts of exemplary embodiments of a method according to the first aspect of the invention.

FIG. 4a is a flow chart 400 illustrating an exemplary embodiment of a method according to the first aspect of the invention. The actions of flow chart 400 may be performed by sender device 100, for example. In the following, it is assumed that processor 101 and the program code stored in memory 102 of sender device 100 may cause the sender device 100 to perform all or some of actions 401 to 407 when program code is retrieved from program memory 102 and executed by processor 101. Furthermore, it is assumed that sender device 100 is part of system 300 described above with respect to FIG. 3.

Sender device 100 receives and/or holds available a plurality of payload information items (action 401). For example, the plurality of payload information items may be at least partially received by communication means 104 and/or by user input on optional user interface 105. Alternatively or additionally, the plurality of payload information items may be at least partially stored in program memory 102.

Each of the plurality of payload information items may represent information intended to be received by one or more recipients of a message (e.g. the message generated in action 406). For example, the plurality of payload information items may represent information necessary to perform different associated business processes such as completing different bookings for a travel arrangement.

Sender device 100 encrypts the plurality of payload information items such that each of the plurality of encrypted payload information items is decryptable with a respective decryption key of a plurality of decryption keys (action 402).

Without limiting the scope of the invention, it is assumed in the following that each of the plurality of payload information items is encrypted by use of a symmetric cryptography algorithm. Accordingly, the respective decryption key of the plurality of decryption keys is a symmetric key that is different for each of the plurality of payload information items. This may have the effect that access to each of the plurality of encrypted payload information items may be restricted to recipient being associated with and/or having access to the respective decryption key of the plurality of decryption keys.

Using a symmetric cryptography algorithm allows to reduce the processing time and/or capacity for encrypting and/or decrypting compared to an asymmetric cryptography algorithm. As disclosed above, exemplary symmetric cryptography algorithms are the AES-Algorithm and the 3DEA-Algorithm.

Sender device 100 determines whether at least one recipient is allowed to access one or more of the encrypted payload information items of the plurality of encrypted payload information items (action 403).

A recipient may be understood to mean a person (e.g. a user) and/or an organization (e.g. a company such as a service provider company) to which the message is sent and/or which receives the message. In the following, it is assumed that the at least one recipient uses recipient device 200-1 for sending and/or receiving messages.

The determining may for example be based on access rules for the encrypted payload information items. For example, such access rules define which recipient(s) are allowed to access which one or more encrypted payload information items of the plurality of encrypted payload information. The access rules may be received and/or hold available by the sender device 100. For example, the access rules may be at least partially received by communication means 104 and/or by user input on optional user interface 105. Alternatively or additionally, the access rules may be at least partially stored in program memory 102. As disclosed above, an example of access rules is an access control matrix defining which recipient(s) are allowed to access which one or more encrypted payload information items of the plurality of encrypted payload information.

An exemplary embodiment of such an access rule matrix 800 for a first recipient using recipient device 200-1 for sending and/or receiving messages and a second recipient using recipient device 200-2 for sending and/or receiving messages is shown in FIG. 6a. As indicated in access rule matrix 800 the first recipient is allowed to access encrypted payload information items 1 to 3 (i.e. Items 1 to 3), whereas the second recipient is only allowed to access encrypted payload information items 1 and 2 (i.e. Items 1 to 3).

After determining whether the at least one recipient (i.e. the recipient which uses recipient device 200-1 for sending and/or receiving messages) is allowed to access one or more of the encrypted payload information items of the plurality of encrypted payload information items, at least one decryption key set for the at least one recipient is generated (action 404). The at least one decryption key set for the at least one recipient comprises a respective decryption key of the plurality of decryption keys for each of the one or more of the encrypted payload information items of the plurality of payload information items for which it is determined that the at least one recipient is allowed to access.

Sender device 100 encrypts the at least one decryption key set for the at least one recipient to obtain an encrypted decryption key set that it is decryptable with a decryption key associated with and/or accessible to the at least one recipient (action 405).

The decryption key may be understood to be associated with and/or accessible to the at least one recipient if the decryption key is stored in program memory 202 of recipient device 200-1.

Without limiting the scope of the invention, it is assumed in the following that the decryption key set is encrypted by use of an asymmetric cryptography algorithm. Accordingly, the respective decryption key of the plurality of decryption keys may be a private key of an asymmetric key pair associated with and/or accessible to the recipient. The sender device 100 may receive the public key of this asymmetric key pair for encrypting the decryption key set from the recipient device 200-1 and/or a public key server (e.g. a public key server of system 300).

In combination with the symmetric cryptography algorithm used for encrypting the payload information items a hybrid cryptography scheme may be realized by using an asymmetric cryptography algorithm for encrypting the decryption key set. This may have the effect that it is not necessary that the sender and the recipient share a common secret.

Optionally, actions 403 to 405 may be repeated for one or more further recipients.

Sender device 100 generates a message comprising the plurality of encrypted payload information items and the at least one encrypted decryption key set (action 406). In case that actions 403 to 405 have been repeated for one or more further recipients, the message may comprise for each of the one or more further recipients a respective encrypted decryption key set.

For example, the message is at least partially assembled from the plurality of encrypted payload information items and the at least one encrypted decryption key set. Additionally, the message may comprise further information items, for example for facilitating and/or controlling transmitting of the message such as header and/or metadata information items (e.g. a signature information item, a sender information item, a recipient information item, an encryption information item, and/or a message policy information item).

An exemplary embodiment of such a message 900-1 is shown in FIG. 6b. Message 900-1 comprises encrypted payload information items 1 to 3 as denoted by reference signs 901 to 903 in FIG. 6b. In the following it is assumed that these encrypted payload information items 1 to 3 corresponds to encrypted payload information items 1 to 3 of access rule matrix 800 (i.e. Items 1 to 3). As indicated in FIG. 6b, encrypted payload information item 1 is encrypted by KEY1, encrypted payload information item 2 is encrypted by KEY2 and encrypted payload information item 3 is encrypted by KEY3.

Furthermore, message 900-1 comprises encrypted decryption key sets 704 and 705. Encrypted decryption key set 904 comprises KEY1, KEY2 and KEY3 and is encrypted with PUB_KEY_REC1 which is a public key of an asymmetric key pair associated with and/or associable to the first recipient of access rule matrix 800 using recipient device 200-1 (e.g. PRIV_KEY_REC1 which is the private key of this asymmetric key pair is stored in program memory 102 of recipient device 200-1). Encrypted decryption key set 905 comprises KEY1 and KEY2 and is encrypted with PUB_KEY_REC2 which is a public key of an asymmetric key pair associated with and/or associable to the second recipient of access rule matrix 800 using recipient device 200-2 (e.g. PRIV_KEY_REC2 which is the private key of this asymmetric key pair is stored in program memory 202 of recipient device 200-2). Accordingly, encrypted decryption key sets 904 and 906 reflect the access rules defined by access rule matrix 800.

As indicated by reference sign 906, message 900-1 may optionally comprise further information items.

The message is sent by sender device 100 to the at least one recipient (action 407). Sending the message to at least one recipient may be understood to mean that the message is sent such that it is receivable by the recipient device 200-1. For example, the message is sent by sender device 100 via communication link 301 to recipient device 200-1.

Optionally, the message may be sent by sender device 100 to one or more further recipients (e.g. recipient device 200-2).

Figure 4B:
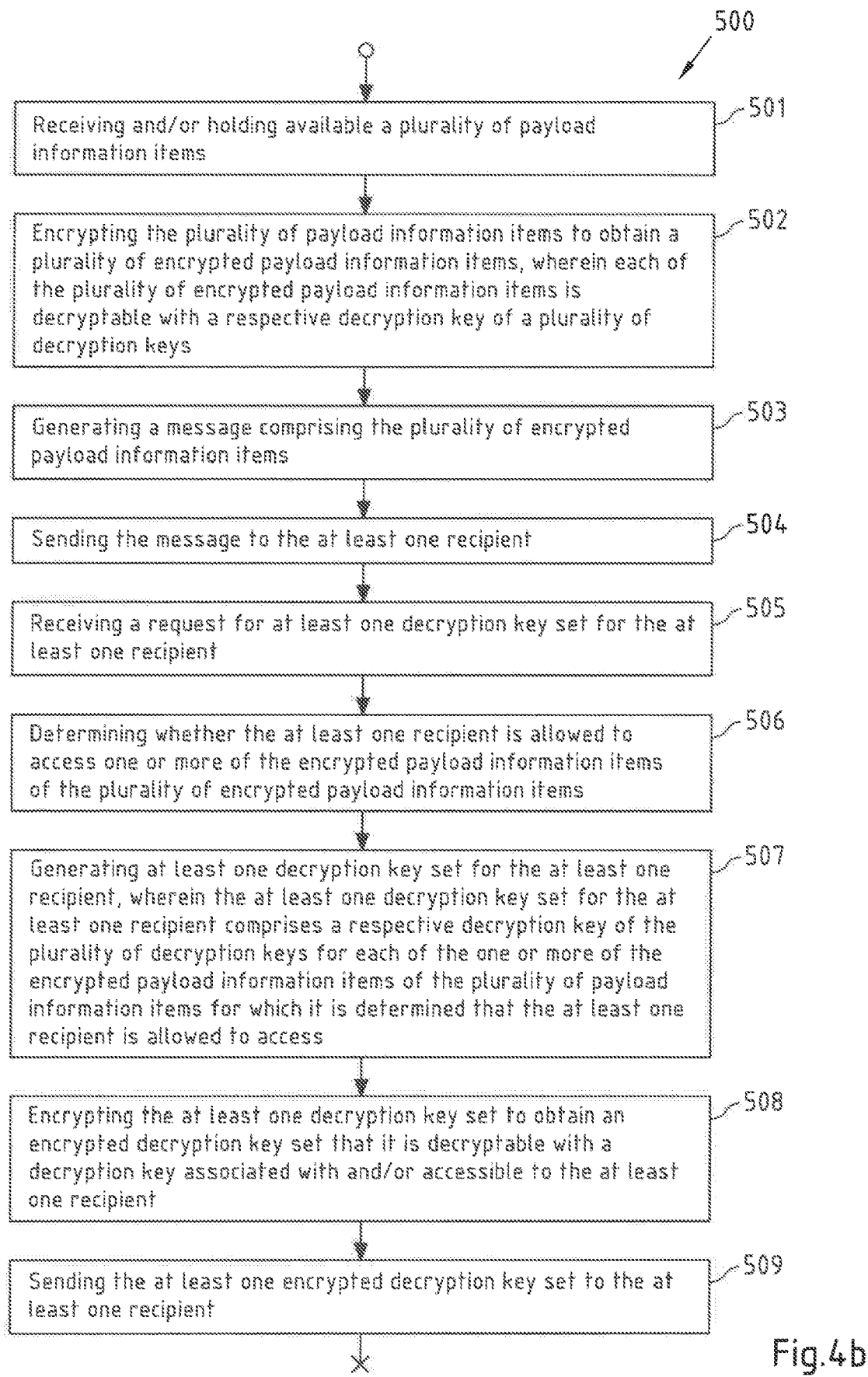

FIG. 4b is a flow chart 500 illustrating another exemplary embodiment of a method according to the first aspect of the invention. The actions of flow chart 500 may be performed by sender device 100, for example. In the following, it is assumed that processor 101 and the program code stored in memory 102 of sender device 100 may cause the sender device 100 to perform all or some of actions 501 to 509 when program code is retrieved from program memory 102 and executed by processor 101. Furthermore, it is assumed that sender device 100 is part of system 300 described above with respect to FIG. 3.

Sender device 100 receives and/or holds available a plurality of payload information items (action 501) and encrypts the plurality of payload information items such that each of the plurality of encrypted payload information items is decryptable with a respective decryption key of a plurality of decryption keys (action 502). Actions 501 and 502 corresponds to actions 401 and 402 of flowchart 400 as disclosed above.

In contrast to flowchart 400, sender device 100 now generates a message comprising the plurality of encrypted payload information items (action 503).

For example, the message is at least partially assembled from the plurality of encrypted payload information items. Additionally, the message may comprise further information items, for example for facilitating and/or controlling transmitting of the message such as header and/or metadata information items (e.g. a signature information item, a sender information item, a recipient information item, an encryption information item, and/or a message policy information item).

Figure 6C:
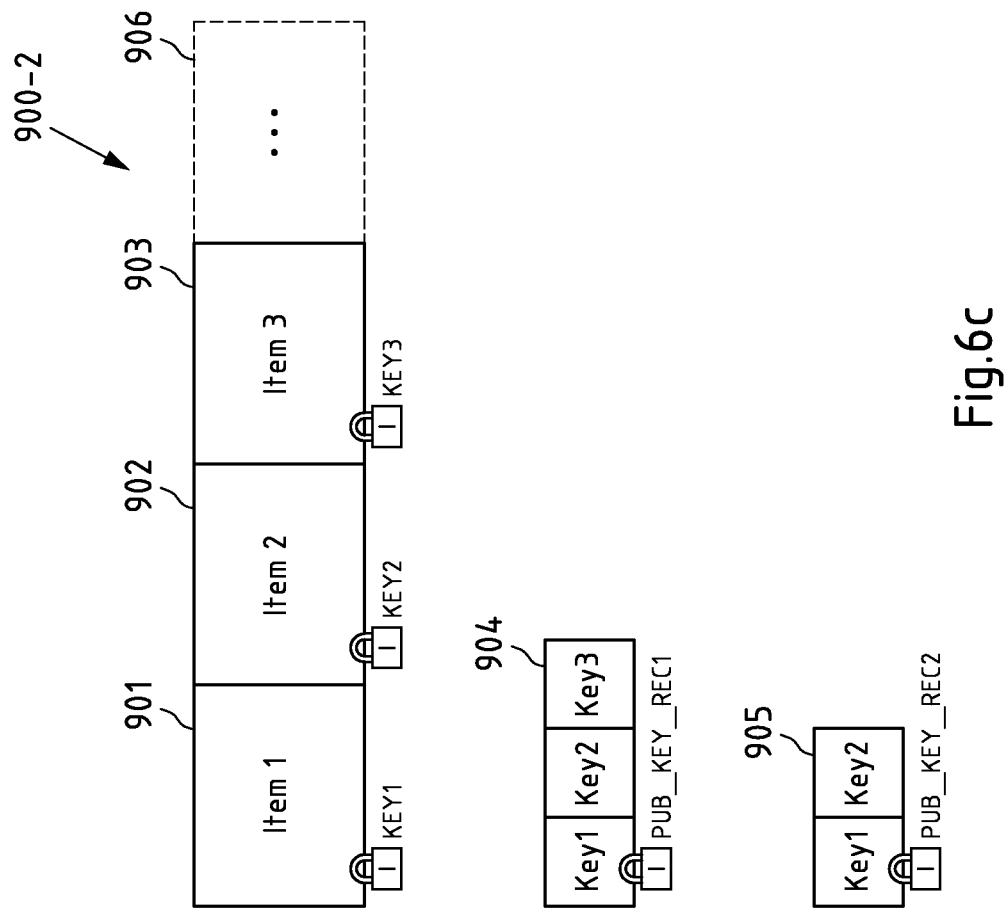

An exemplary embodiment of such a message 900-2 is shown in FIG. 6c. Message 900-2 comprises encrypted payload information items 1 to 3 as denoted by reference signs 901 to 903 in FIG. 6c. In the following it is assumed that these encrypted payload information items 1 to 3 correspond to encrypted payload information items 1 to 3 of access rule matrix 800 (i.e. Items 1 to 3). As indicated in FIG. 6c, encrypted payload information item 1 is encrypted by KEY1, encrypted payload information item 2 is encrypted by KEY2 and encrypted payload information item 3 is encrypted by KEY3. As indicated by reference sign 906, message 900-2 may optionally comprise further information items.

The message is sent by sender device 100 to the at least one recipient (action 504). Action 504 corresponds to action 407 of flowchart 400 as disclosed above. Optionally, the message may be sent by sender device 100 to one or more further recipients (e.g. recipient device 200-2).

Subsequently, the sender device 100 receives a request for a decryption key set for the at least one recipient (action 505). For example, the request is received by sender device 100 via communication link 301 from recipient device 200-1.

The request may comprise an information item identifying the at least one recipient.

In response to the request, the sender device 100 determines whether the at least one recipient (e.g. the at least one recipient identified in the request) is allowed to access one or more of the encrypted payload information items of the plurality of encrypted payload information items (action 506). The determining is performed as disclosed above regarding action 403 of flowchart 400.

After determining whether the at least one recipient is allowed to access one or more of the encrypted payload information items of the plurality of encrypted payload information items, at least one decryption key set for the at least one recipient is generated (action 507) and the at least one decryption key is encrypted to obtain an encrypted decryption key set that it is decryptable with a decryption key associated with and/or accessible to the at least one recipient (action 508). These actions correspond to actions 404 and 405 of flowchart 400 as disclosed above.

Exemplary embodiments of such encrypted decryption key sets 904 and 906 are shown in FIG. 6c. Encrypted decryption key set 904 comprises KEY1, KEY2 and KEY3 and is encrypted with PUB_KEY_REC1 which is a public key of an asymmetric key pair associated with and/or associable to the first recipient of access rule matrix 800 using recipient device 200-1 (e.g. PRIV_KEY_REC1 which is the private key of this asymmetric key pair is stored in program memory 102 of recipient device 200-1). Encrypted decryption key set 905 comprises KEY1 and KEY2 and is encrypted with PUB_KEY_REC2 which is a public key of an asymmetric key pair associated with and/or associable to the second recipient of access rule matrix 800 using recipient device 200-2 (e.g. PRIV_KEY_REC2 which is the private key of this asymmetric key pair is stored in program memory 202 of recipient device 200-2). As disclosed above, encrypted decryption key sets 904 and 906 reflect the access rules defined by access rule matrix 800.

Subsequently, the sender device 100 sends the at least one encrypted decryption key set to the at least one recipient (action 509). Sending the at least one encrypted decryption key set to the at least one recipient may be understood to mean that the at least one encrypted decryption key set is sent such that it is receivable by the recipient device 200-1. For example, the at least one encrypted decryption key set is sent by sender device 100 via communication link 301 to recipient device 200-1.

For example, actions 505 to 509 may be repeated if one or more further requests for a decryption key set for one or more further recipients are received.

Figure 5A:
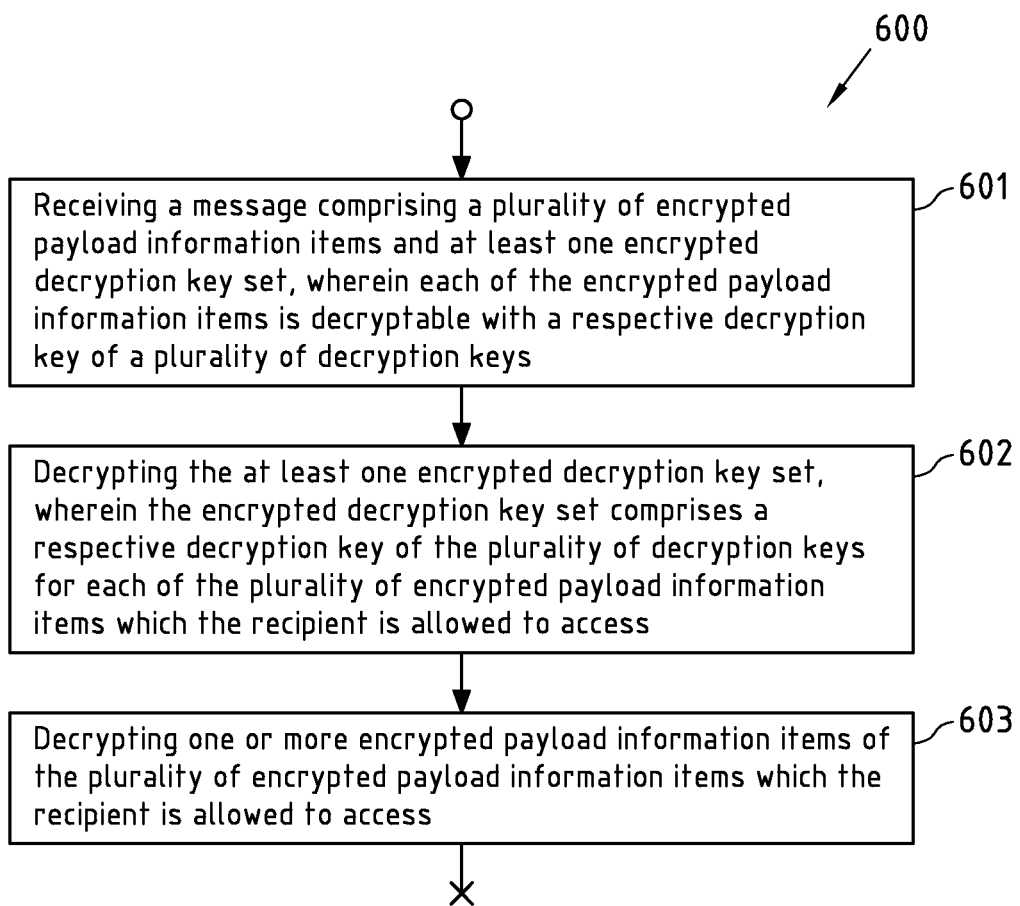

FIG. 5a is a flow chart 600 illustrating an exemplary embodiment of a method according to the second aspect of the invention. The actions of flow chart 600 may be performed by recipient device 200-1 of system 300 described above with respect to FIG. 3, for example. In the following, it is assumed that processor 201 and the program code stored in memory 202 of recipient device 200-1 may cause the recipient device 200-1 to perform all or some of actions 601 to 603 when program code is retrieved from program memory 202 and executed by processor 201.

The recipient device 200-1 receives a message comprising a plurality of encrypted payload information items and at least one encrypted decryption key set, wherein each of the encrypted payload information items is decryptable with a respective decryption key of a plurality of decryption keys (action 601). For example, the message is received by recipient device 200-1 via communication link 301 from sender device 100.

Without limiting the scope of the invention, it is assumed in the following that the message received in action 601 corresponds to the message sent in action 407 of flowchart 400 as disclosed above. For example, the message is message 900-1 shown in FIG. 6*b*.

A recipient may be understood to mean a person (e.g. a user) and/or an organization (e.g. a company such as a service provider company) to which the message is sent and/or which receives the message. By receiving the message by the recipient device 200-1 the message may thus be understood to be received by the recipient using recipient device 200-1 for sending and/or receiving messages.

The recipient device 200-1 decrypts the at least one encrypted decryption key set, wherein the encrypted decryption key set comprises a respective decryption key of the plurality of decryption keys for each of the plurality of encrypted payload information items which the recipient is allowed to access (action 602).

As disclosed above, the at least one encrypted decryption key set is encrypted such that it is decryptable with a decryption key associated with and/or accessible to the at least one recipient using recipient device 200-1 for sending and/or receiving messages. Without limiting the scope of the invention, it is assumed that the at least one encrypted decryption key set is encrypted by use of an asymmetric cryptography algorithm. For example, the decryption key is a private key of an asymmetric key pair stored in program memory 202 of recipient device 200-1. Alternatively, the decryption key may be received by recipient device 200-1 (e.g. by input on a user input interface of recipient device 200-1). For example, the decryption key is PUB_KEY_REC1 for decrypting encrypted decryption key set 904 of message 900-1 shown in FIG. 6*b*.

Subsequently, the recipient device 200-1 decrypts the one or more encrypted payload information items of said plurality of encrypted payload information items which said recipient is allowed to access (action 603). For example, the decryption keys of the at least one encrypted decryption key set that is decrypted in action 602 may be used for decrypting the one or more encrypted payload information items of said plurality of encrypted payload information items.

The recipient using recipient device 200-1 for sending and/or receiving messages may be understood to be allowed to access each of the plurality of encrypted payload information items (i.e. the one or more encrypted payload information items of the plurality of encrypted payload information items) for which the at least one encrypted decryption key set comprises a respective decryption key of the plurality of decryption keys.

Without limiting the scope of the invention, it is assumed that each of the plurality of payload information items is encrypted by use of a symmetric cryptography algorithm. Accordingly, the decryption keys of the encrypted decryption key set that is decrypted in action 602 are symmetric keys that are different for each of the one or more encrypted payload information items.

Optionally, the message may be sent (e.g. forwarded) by recipient device 200-1 to one or more further recipients (e.g. recipient device 200-2). For example, the message may be sent by recipient device 200-1 via communication link 302 to recipient device 200-2. Recipient device 200-2 may then perform actions 601 to 603 of flowchart 600 as disclosed above.

FIG. 5*b* is a flow chart 700 illustrating an exemplary embodiment of a method according to the second aspect of the invention. The actions of flow chart 700 may be performed by recipient device 200-1 of system 300 described above with respect to FIG. 3, for example. In the following, it is assumed that processor 201 and the program code stored in memory 202 of recipient device 200-1 may cause the recipient device 200-1 to perform all or some of actions 701 to 705 when program code is retrieved from program memory 202 and executed by processor 201.

The recipient device 200-1 receives a message comprising a plurality of encrypted payload information items, wherein each of the encrypted payload information items is decryptable with a respective decryption key of a plurality of decryption keys (action 701). For example, the message is received by recipient device 200-1 via communication link 301 from sender device 100.

Without limiting the scope of the invention, it is assumed in the following that the message received in action 601 corresponds to the message sent in action 503 of flowchart 500 as disclosed above. For example, the message is message 900-2 shown in FIG. 6*c*.

The recipient device 200-1 sends a request for at least one decryption key set for the least one recipient (action 702). For example, the request is sent by recipient device 200-1 via communication link 301 to sender device 100.

The request may corresponds to the request received by sender device 100 in action 505 of flowchart 500 as disclosed above and may comprise an information item identifying the at least one recipient.

As a response to the request, recipient device 200-1 receives at least one encrypted decryption key set (action 703). Without limiting the scope of the invention, it is assumed in the following that the at least one encrypted decryption key set received in action 703 corresponds to the at least one encrypted decryption key set sent by sender device 100 in action 506 of flowchart 500 as disclosed above.

The recipient device 200-1 decrypts the at least one encrypted decryption key set, wherein the encrypted decryption key set comprises a respective decryption key of the plurality of decryption keys for each of the plurality of encrypted payload information items which the recipient is allowed to access action (704). For example, the decryption key is PUB_KEY_REC1 for decrypting encrypted decryption key set 904 shown in FIG. 6*c*. Action 704 corresponds to action 602 of flowchart 600 as disclosed above.

Subsequently, the recipient device 200-1 decrypts one or more encrypted payload information items of the plurality of encrypted payload information items which the recipient is allowed to access (action 705). For example, the decryption keys of the at least one encrypted decryption key set that is decrypted in action 704 may be used for decrypting the one or more encrypted payload information items of said plurality of encrypted payload information items. Action 705 corresponds to action 603 of flowchart 600 as disclosed above.

Optionally, the message may be sent (e.g. forwarded) by recipient device 200-1 to one or more further recipients (e.g. recipient device 200-2). For example, the message may be sent by recipient device 200-1 via communication link 302 to recipient device 200-2. Recipient device 200-2 may then perform actions 701 to 705 of flowchart 700 as disclosed above.

Figure 7:
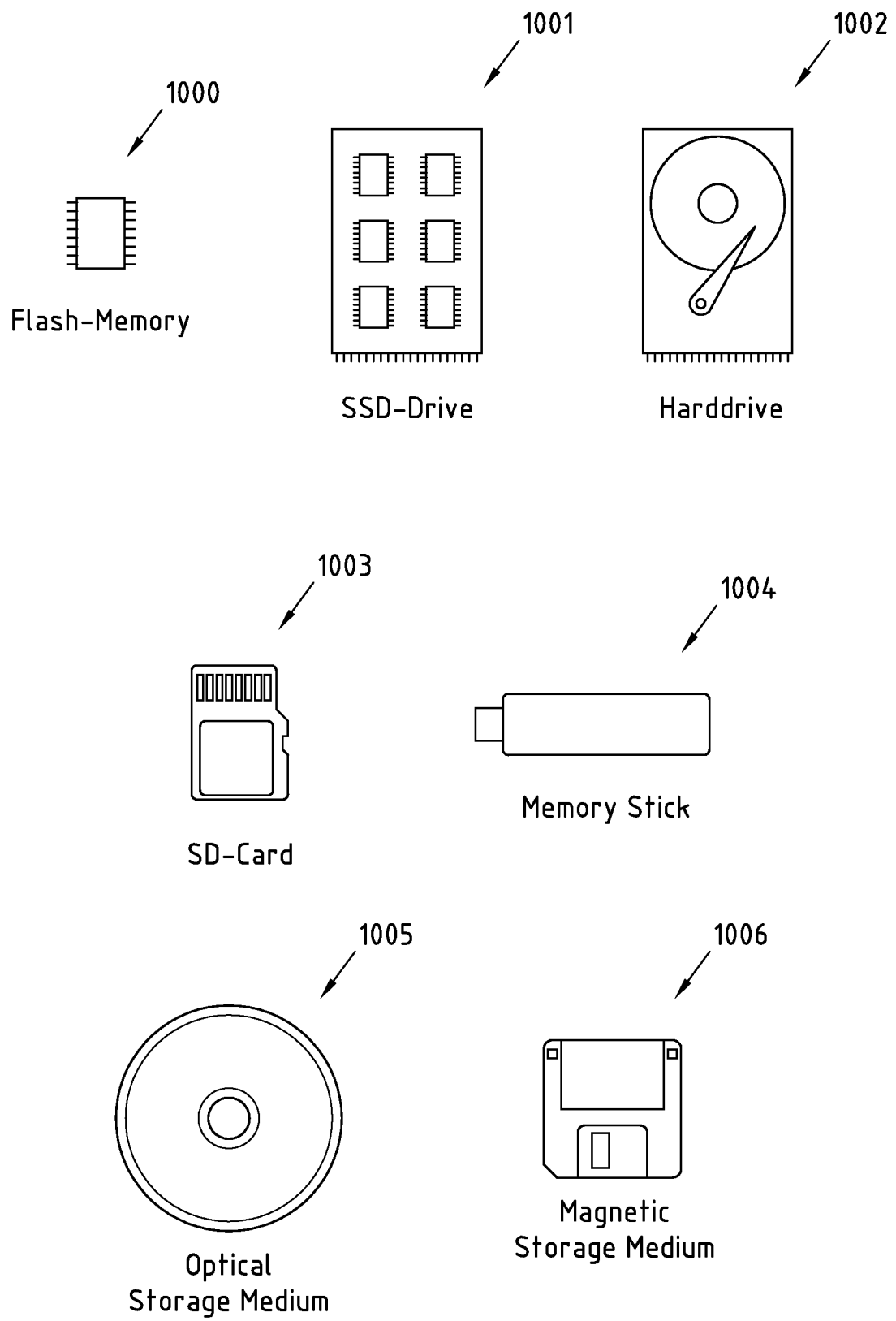
FIG. 7 is a schematic illustration of examples of tangible and non-transitory storage media according to the invention.

FIG. 7 is a schematic illustration of examples of tangible and non-transitory computer-readable storage media according to the present invention that may for instance be used to implement program memory 102 of FIGS. 1 and 2. To this end, FIG. 6 displays a flash memory 1000, which may for instance be soldered or bonded to a printed circuit board, a solid-state drive 1001 comprising a plurality of memory chips (e.g. Flash memory chips), a magnetic hard drive 102, a Secure Digital (SD) card 1003, a Universal Serial Bus (USB) memory stick 1004, an optical storage medium 1005 (such as for instance a CD-ROM or DVD) and a magnetic storage medium 1006.

Any presented connection in the described embodiments is to be understood in a way that the involved components are operationally coupled. Thus, the connections can be direct or indirect with any number or combination of intervening elements, and there may be merely a functional relationship between the components.

Any of the processors mentioned in this text, in particular but not limited to processors 101 and 201 of FIGS. 1 and 2, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method performed by an apparatus, said method comprising:
generating a message comprising a plurality of encrypted payload information items, wherein each of said plurality of encrypted payload information items is decryptable with a respective decryption key of a plurality of decryption keys, wherein said respective decryption key of said plurality of decryption keys is different for each of said plurality of encrypted payload information items, wherein said plurality of encrypted payload information items comprises at least a first encrypted payload information item and a second encrypted payload information item, wherein said first encrypted payload information item is decryptable with a first decryption key and the second encrypted payload information item is decryptable with a second decryption key different from said first decryption key,
sending said message to at least one recipient,
determining whether said at least one recipient is allowed to access one or more of said encrypted payload information items of said plurality of encrypted payload information items, and
generating at least one decryption key set for said at least one recipient, wherein said at least one decryption key set for said at least one recipient comprises a respective decryption key of said plurality of decryption keys for each of said one or more of said encrypted payload information items of said plurality of payload information items for which it is determined that said at least one recipient is allowed to access.

2. The method according to claim 1, wherein different recipients of said message are allowed to access at least partially different encrypted payload information items of said plurality of encrypted payload information items, and/or wherein said payload information items of said plurality of payload information items represent information necessary to perform one or more associated business processes.

3. The method according to claim 1, said method further comprising:
- receiving and/or holding available a plurality of payload information items, and
- encrypting said plurality of payload information items to obtain said plurality of encrypted payload information items.

4. The method according to claim 1, wherein said encrypted payload information items are encrypted by use of one of:
- an asymmetric cryptography algorithm, and
- a symmetric cryptography algorithm.

5. The method according to claim 1, said method further comprising:
- encrypting said at least one decryption key set to obtain an encrypted decryption key set that it is decryptable with a decryption key associated with and/or accessible to said at least one recipient.

6. The method according to claim 5, wherein said at least one encrypted decryption key set is encrypted by use of one of:
- an asymmetric cryptography algorithm, and
- a symmetric cryptography algorithm.

7. The method according to claim 5, wherein said message further comprises said at least one encrypted decryption key set.

8. The method according to claim 1, said method further comprising:
- receiving a request for said at least one decryption key set for said at least one recipient, and
- sending said at least one decryption key set to said at least one recipient.

9. The method according to claim 1, wherein said message further comprises at least one of:
- a signature information item,
- a sender information item,
- a recipient information item,
- a key information item,
- an encryption information item, and
- a message policy information item.

10. The method according to claim 1, wherein said message is forwarded by said at least one recipient to one or more further recipients.

11. An apparatus, said apparatus comprising at least one processor and at least one memory including computer program code, the at least one memory and the computer program code configured to, with the at least one processor, cause said apparatus at least to perform:
- generating a message comprising a plurality of encrypted payload information items, wherein each of said plurality of encrypted payload information items is decryptable with a respective decryption key of a plurality of decryption keys, wherein said respective decryption key of said plurality of decryption keys is different for each of said plurality of encrypted payload information items, wherein said plurality of encrypted payload information items comprises at least a first encrypted payload information item and a second encrypted payload information item, wherein said first encrypted payload information item is decryptable with a first decryption key and the second encrypted payload information item is decryptable with a second decryption key different from said first decryption key,
- sending said message to at least one recipient,
- determining whether said at least one recipient is allowed to access one or more of said encrypted payload information items of said plurality of encrypted payload information items, and
- generating at least one decryption key set for said at least one recipient, wherein said at least one decryption key set for said at least one recipient comprises a respective decryption key of said plurality of decryption keys for each of said one or more of said encrypted payload information items of said plurality of payload information items for which it is determined that said at least one recipient is allowed to access.

12. A method performed by an apparatus, said method comprising:
- receiving a message comprising a plurality of encrypted payload information items, wherein each of said encrypted payload information items is decryptable with a respective decryption key of a plurality of decryption keys, wherein said respective decryption key of said plurality of decryption keys is different for each of said plurality of encrypted payload information items, wherein said plurality of encrypted payload information items comprises at least a first encrypted payload information item and a second encrypted payload information item, wherein said first encrypted payload information item is decryptable with a first decryption key and the second encrypted payload information item is decryptable with a second decryption key different from said first decryption key,
- decrypting one or more encrypted payload information items of said plurality of encrypted payload information items, and
- decrypting an encrypted decryption key set, wherein said encrypted decryption key set comprises a respective decryption key for each of said one or more encrypted payload information items of said plurality of payload information items which a recipient is allowed to access.

13. An apparatus, said apparatus comprising at least one processor and at least one memory including computer program code, the at least one memory and the computer program code configured to, with the at least one processor, cause said apparatus at least to perform:
- receiving a message comprising a plurality of encrypted payload information items, wherein each of said encrypted payload information items is decryptable with a respective decryption key of a plurality of decryption keys, wherein said respective decryption key of said plurality of decryption keys is different for each of said plurality of encrypted payload information items, wherein said plurality of encrypted payload information items comprises at least a first encrypted payload information item and a second encrypted payload information item, wherein said first encrypted payload information item is decryptable with a first decryption key and the second encrypted payload information item is decryptable with a second decryption key different from said first decryption key,
- decrypting one or more encrypted payload information items of said plurality of encrypted payload information items, and
- decrypting an encrypted decryption key set, wherein said encrypted decryption key set comprises a respective decryption key for each of said one or more encrypted payload information items of said plurality of payload information items which a recipient is allowed to access.

14. A system, said system comprising:
at least one apparatus according to claim 11, and
at least one apparatus comprising at least one processor and at least one memory including computer program code, the at least one memory and the computer program code configured to, with the at least one processor, cause said apparatus at least to perform:
receiving a message comprising a plurality of encrypted payload information items, wherein each of said encrypted payload information items is decryptable with a respective decryption key of a plurality of decryption keys, wherein said respective decryption key of said plurality of decryption keys is different for each of said plurality of encrypted payload information items, wherein said plurality of encrypted payload information items comprises at least a first encrypted payload information item and a second encrypted payload information item, wherein said first encrypted payload information item is decryptable with a first decryption key and the second encrypted payload information item is decryptable with a second decryption key different from said first decryption key,
decrypting one or more encrypted payload information items of said plurality of encrypted payload information items, and
decrypting an encrypted decryption key set, wherein said encrypted decryption key set comprises a respective decryption key for each of said one or more encrypted payload information items of said plurality of payload information items which a recipient is allowed to access.

15. The apparatus according to claim 11, wherein different recipients of said message are allowed to access at least partially different encrypted payload information items of said plurality of encrypted payload information items, and/or wherein said payload information items of said plurality of payload information items represent information necessary to perform one or more associated business processes.

16. The apparatus according to claim 11, wherein the at least one memory and the computer program code are further configured to, with the at least one processor, cause said apparatus at least to perform:
receiving and/or holding available a plurality of payload information items, and
encrypting said plurality of payload information items to obtain said plurality of encrypted payload information items.

17. The apparatus according to claim 11, wherein said encrypted payload information items are encrypted by use of one of:
an asymmetric cryptography algorithm, and
a symmetric cryptography algorithm.

18. The apparatus according to claim 11, wherein the at least one memory and the computer program code are further configured to, with the at least one processor, cause said apparatus at least to perform:
encrypting said at least one decryption key set to obtain an encrypted decryption key set that it is decryptable with a decryption key associated with and/or accessible to said at least one recipient.

19. The apparatus according to claim 18, wherein said message further comprises said at least one encrypted decryption key set.

20. The apparatus according to claim 11, wherein the at least one memory and the computer program code are further configured to, with the at least one processor, cause said apparatus at least to perform:
receiving a request for said at least one decryption key set for said at least one recipient, and
sending said at least one decryption key set to said at least one recipient.

21. The apparatus according to claim 11, wherein said message is forwarded by said at least one recipient to one or more further recipients.

* * * * *